Jan. 5, 1926.
L. R. ZIFFERER
CLAMP
Filed May 3, 1923
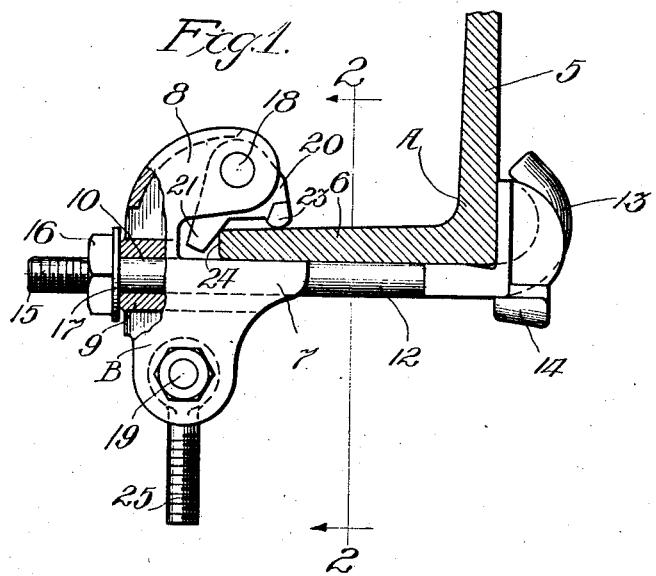
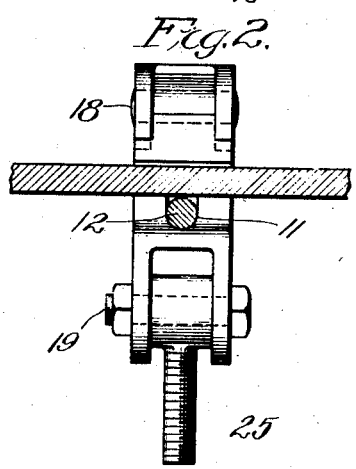
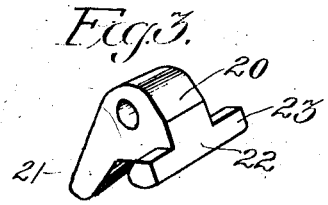
Inventor:
Lothar R. Zifferer Patented Jan. 5, 1926.

1,568,122

UNITED STATES PATENT OFFICE.

LOTHAR R. ZIFFERER, OF COLUMBIA, PENNSYLVANIA.

CLAMP.

Application filed May 3, 1923. Serial No. 636,344.

*To all whom it may concern:*

Be it known that I, LOTHAR R. ZIFFERER, a citizen of the United States, residing at Columbia, in the county of Lancaster and State of Pennsylvania, have invented certain new and useful Improvements in Clamps, of which the following is a specification.

This invention relates to a device which clamps to a support, such as channel iron, I-beam, angle iron, or the like, so as to facilitate connection therewith of a suspension element—a pipe hanger, for example. It may be advantageously employed as with sprinkler systems which include lines of piping along a wall or ceiling, and which require special connecting devices when support is derived from a beam of the kind contemplated. It is with a view to providing a clamp which may be conveniently connected with any such beam of standard construction that this invention is directed.

Referring to the drawing:

Figure 1 is a fragmentary section through a beam of channel or angle formation, and shows attached thereto a clamp which embodies the improved features of my invention;

Fig. 2 is a sectional view on line 2—2 of Fig. 1; and

Fig. 3 is a detail in perspective of the cam or wedge element removed from the clamp.

The beam A represented in Fig. 1 may be of conventional construction, and is shown as comprising a vertically disposed web 5 from which is laterally extended a flange 6. Such a beam may be formed of angle iron, channel iron, or otherwise. The clamp B which is designed for attachment to such a beam comprises a body whereon is formed a shoulder 7 adapted to lie in part beneath the beam flange 6. The clamp is also provided with a head 8 connected to its body by a neck 9 through which is an opening 10. Aligned with this opening is a groove 11 extending along the shoulder 7 so as to provide a seat for a bolt 12 whose head 13 is shown as in the form of a hook.

In applying the clamp to a channel iron or angle iron, a shoe 14 is preferably rested against the corner of the beam with the hook engaging therewith in a well known manner; the shoe, however, need not be used where the clamp is attached to an I-beam, since the remote edge of its flange is well suited for engagement by the hook end of the bolt without the aid of any accessory for this purpose. As the construction of such a bolt and shoe forms no part of this invention, and is well known, no further description thereof is deemed necessary.

The other bolt end 15 is threaded so as to receive a nut 16 which is shown as bearing against a washer 17 lying adjacent the neck portion of the clamp. By tightening the nut the clamp will be moved along the bolt and transversely of the flange so as to effect a tight engagement therewith with the aid of the means which will now be described.

The clamp head, as well as its body, is formed by preference to provide spaced walls between which may be received, respectively, a pin 18 and bolt 19. The pin 18 affords a pivotal mounting for a rocking cam or wedge element 20 the construction of which is best represented in Fig. 3. This element comprises, in effect, a lever 21 and a cam 22, the latter being provided with an elongated foot 23 which is adapted to bear with pressure upon the upper side of the flange 6. The wedge lever lies adjacent the flange edge 24 so as to be engaged thereby when the clamp is forced transversely upon the beam flange. It follows, therefore, that with tightening of the nut 16 a pressure is exerted upon this lever such as to force the cam foot down tightly upon the beam flange. It thus results that the clamp is secured firmly to the beam by the simple operation of turning the nut. This securement of the clamp may be made so tight, in fact, that even if the nut should become loose, the wedging or cam engagement of the foot 22 will remain effective to sustain the clamp tightly in position.

The body of the clamp through which the bolt is extended is further adapted to support a hanger 25 of any desired kind. When pivoted to the bolt 19 in the manner shown in Figs. 1 and 2, such a hanger may have capacity for swinging within the clamp, or be held immovably therein if the bolt be tightened sufficiently for this purpose.

A device answering to the preceding description may be very conveniently and quickly installed with the application of a wrench to one nut only. By tightening this nut the clamp is not only drawn transversely upon the beam flange, but a concurrent wedge pressure is brought to bear upon the flange such as to secure the clamp immovably thereupon. My invention, therefore, includes in the construction of the clamp a fixed element—the shoulder—which rests against one side of the beam flange, and a movable element—the pivoted wedge or cam—which bears against the other flange side with an increasing pressure as the nut is tightened to force the clamp transversely of the beam.

I claim:

1. The combination with a beam having a flange, of a clamp adapted to be secured thereto and comprising a fixed element adapted to underlie the flange, and pivoted to the fixed element a rocking wedge element adapted to overlie the flange, and means for forcing the clamp transversely upon the flange whereby the rocking element is wedgingly engaged with the upper flange side, substantially as described.

2. The combination with a beam having a flange, of a clamp attachable thereto and comprising two elements, one movably associated with the other, adapted to engage the beam flange, one of said elements on one flange side and the other on the flange edge and also, at a relatively distant point, upon the opposite flange side, and means for forcing the clamp transversely upon the flange to wedgingly engage the two elements therewith, substantially as described.

3. The combination with a beam having a flange, of a clamp adapted for attachment thereto comprising a shoulder adapted to engage one side of the flange, a rocking wedge element adapted to engage with the opposite flange side and also with the flange edge, means connecting the wedge element pivotally with the clamp, and means for forcing the clamp transversely of the flange whereby the wedge element is caused to rock and bear with pressure upon the flange at two points, substantially as described.

4. The combination with a beam having a flange, of a clamp adapted for attachment thereto comprising a fixed element adapted to engage one side of the flange and a pivoted cam element adapted to engage both the other side and one edge of the flange, and means for forcing the clamp transversely of the flange whereby the pivoted element is moved to engage the flange with a variable wedge pressure, substantially as described.

5. The combination with a beam having a flange, of a clamp adapted for attachment thereto, the clamp including in its assembly two elements, one fixed and adapted to engage one side of the flange, and the other pivoted and adapted to engage at separated points with both the opposite flange side and the flange edge, and means for forcing the clamp transversely of the flange whereby the pivoted element is moved through engagement with the flange edge to bear with increasing pressure upon its side, substantially as described.

6. The combination with a beam having a flange, of a clamp adapted for attachment thereto, the clamp comprising a body formed in part with spaced walls, a wedge element pivotally mounted between the walls in position to engage at separated points both one side of the beam flange and one edge thereof, a shoulder formed on the clamp adapted to engage the opposite flange side, there being an opening transversely through the clamp, a bolt entered through the opening and having one end engaged with the beam, and a nut on the bolt adapted to bear against the clamp to force the same transversely of the beam flange whereby the flange edge effects a rotation of the wedge element to cause a variable pressure to be exerted upon the flange, substantially as described.

7. The combination with a flanged beam of a clamp having rigid means for engaging one flange side and other means movable with respect to the rigid means for engaging an opposite flange side and one edge thereof, and a device associated with the clamp adapted to draw the same toward the engaged flange edge whereby the movable means is caused to bear with increasing pressure upon the flange portions engaged thereby, substantially as described.

LOTHAR R. ZIFFERER.